(12) United States Patent
Dong et al.

(10) Patent No.: US 10,296,223 B2
(45) Date of Patent: May 21, 2019

(54) METHODS AND APPARATUS FOR CONTROLLING DATA READING FROM A STORAGE SYSTEM

(71) Applicant: EMC IP HOLDING COMPANY LLC, Hopkinton, MA (US)

(72) Inventors: Jibing Dong, Beijing (CN); Huibing Xiao, Beijing (CN); Jian Gao, Beijing (CN); Geng Han, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 203 days.

(21) Appl. No.: 15/382,788

(22) Filed: Dec. 19, 2016

(65) Prior Publication Data

US 2017/0185296 A1 Jun. 29, 2017

(30) Foreign Application Priority Data

Dec. 23, 2015 (CN) .......................... 2015 1 0981602

(51) Int. Cl.
*G06F 3/06* (2006.01)

(52) U.S. Cl.
CPC ............ *G06F 3/061* (2013.01); *G06F 3/0629* (2013.01); *G06F 3/0659* (2013.01); *G06F 3/0683* (2013.01)

(58) Field of Classification Search
CPC ...... G06F 3/061; G06F 3/0659; G06F 3/0683; G06F 3/0629
See application file for complete search history.

(56) References Cited

U.S. PATENT DOCUMENTS

| 5,469,560 A * | 11/1995 | Beglin | G06F 3/0601 707/999.001 |
| 5,937,428 A * | 8/1999 | Jantz | G06F 3/061 710/37 |
| 6,272,606 B1 * | 8/2001 | Dorricott | G11B 27/002 711/111 |
| 8,838,931 B1 * | 9/2014 | Marshak | G06F 3/0605 710/74 |

(Continued)

OTHER PUBLICATIONS

Ganger, Gregory R., et al. "Disk arrays: high-performance, high-reliability storage subsystems." Computer 27.3 (1994): 30-36. (Year : 1994).*

(Continued)

*Primary Examiner* — Francisco A Grullon
(74) *Attorney, Agent, or Firm* — Krishnendu Gupta; Lesley Leonessa (57) ABSTRACT

Embodiments of the present disclosure provide methods and apparatuses for controlling data reading from a storage system. The storage system includes a plurality of storage devices and a backup of the data is stored in each of the plurality of storage devices. A method comprises: receiving a read request for reading data from the storage system; determining, from the plurality of storage devices, a target storage device for processing the read request according to the number of outstanding read requests and the number of completed read requests recorded for each storage device; and sending the read request to the target storage device. The methods or apparatuses according to the embodiments of the present disclosure can reduce I/O response time and improve I/O performance.

17 Claims, 7 Drawing Sheets

(56) References Cited

U.S. PATENT DOCUMENTS

| | | | |
|---|---|---|---|
| 8,868,797 B1* | 10/2014 | Kirac | G06F 3/061 |
| | | | 710/15 |
| 2011/0276758 A1* | 11/2011 | Garmiza | G06F 3/0613 |
| | | | 711/114 |
| 2012/0159094 A1* | 6/2012 | Bridge, Jr. | G06F 11/3433 |
| | | | 711/158 |
| 2013/0227180 A1* | 8/2013 | Bisht | G06F 3/061 |
| | | | 710/39 |

OTHER PUBLICATIONS

Chen, Shenze, and Don Towsley. "A performance evaluation of RAID architectures." IEEE Transactions on computers 45.10 (1996) : 1116-1130. (Year: 1996).*

* cited by examiner

METHODS AND APPARATUS FOR CONTROLLING DATA READING FROM A STORAGE SYSTEM

RELATED APPLICATIONS

This application claim priority from Chinese Patent Application Number CN201510981602.4, filed on Dec. 23, 2015 at the State Intellectual Property Office, China, titled "METHOD AND APPARATUS FOR CONTROLLING READING DATA FROM STORAGE SYSTEMS," the contents of which is herein incorporated by reference in its entirety

FIELD

Embodiments of the present disclosure relate to a data storage system and more particularly relate to methods and an apparatus for controlling data reading from a storage system.

BACKGROUND

In a data storage system, to improve data security and availability, a plurality of backups of data may be stored. Redundant Array of Independent Disks (RAID) 1 is an example solution. RAID 1 achieves data redundancy with disk data mirroring which produces data that are backup of each other in a plurality of independent disks within a RAID group. If RAID1 is at the optimal state, namely, if each disk within the RAID group is available, RAID may access any of the disks to read data. According to the characteristics of RAID1, data from any disk within the RAID group are the same. If one disk is busy so that the original data cannot be processed timely, data may be read from a mirroring copy on another disk directly. Therefore, RAID1 may improve reading performance.

SUMMARY

To obtain the optimal input/output (I/O) performance, RAID as stated above may send a read I/O request to a disk that can process it faster, which can reduce the I/O response time significantly and improve overall input and output per second (IOPs) performance of RAID.

Generally, the response time of the disk depends on, for instance, disk media response time, disk queue depth, I/O size, logic block address (LBA) distribution and background traffic load of a small-size computer system interface (SCSI) port. Take a storage architecture with two processor nodes and a shared back-end disk as an example (e.g. VNX2 sequence of EMC Corporation employs this architecture). In this architecture, read traffic comes separately from each processor node in parallel. If the link to the processor node only has failure at one side (i.e., in the case of single loop failure), the read traffic will be redirected to the peer at the other side, and the peer processor node will send the I/O request to the back-end disk. This redirection causes a lot of difficulties for estimating disk response time. For example, it causes the statistic result of the response delay for each I/O to vary quickly and significantly. Therefore, the estimating result can hardly provide reliable information for determining a proper disk to serve a new I/O request, and it also renders it difficult for a RAID group to perform effective load balance among the disk within the group.

To solve at least some of the problems, embodiments of the present disclosure provide methods and apparatus for controlling data reading from the storage system. The methods and apparatus are not limited to application in the RAID 1 storage system described above as an example, but can be more widely applied to other storage systems where similar problem exists.

A brief summary of the embodiments is given below to provide basic understanding of some aspects of various embodiments. The summary is not intended to identify essentials of the key elements or describe the scope of various embodiments. Its sole purpose is to present some concepts in a simplified form to serve as a prelude for the following more detailed description.

A first aspect of the present disclosure provides a method for controlling data reading from a storage system which includes a plurality of storage devices, and a backup of the data is stored in each of the plurality of storage devices. The method comprises: receiving a read request for reading data from the storage system; determining, from the plurality of storage devices, a target storage device for processing the read request, according to the number of outstanding read requests and the number of completed read requests recorded for each storage device; and sending the read request to the target storage device.

In an embodiment, the number of outstanding read requests and the number of completed read requests recorded for each storage device may be updated by: increasing the number of outstanding read requests for a first storage device of the plurality of storage devices by one, if the first storage device receives a new read request; and decreasing the number of outstanding read requests for a second storage device of the plurality of storage devices by one and increasing the number of completed read requests for the second storage device by one, if the second storage device finishes processing a read request.

In another embodiment, the method may further comprise: resetting the number of completed read requests for each of the plurality of storage devices to zero after sending the read request to the target storage device.

In another embodiment, determining, from the plurality of storage devices, a target storage device for processing the read request according to the number of outstanding read requests and the number of completed read requests recorded for each storage device may comprise: determining, from the plurality of storage devices, a storage device with the smallest number of outstanding read requests as the target storage device.

In an embodiment, determining, from the plurality of storage devices, the storage device with the smallest number of outstanding read requests as the target storage device may further comprise: determining, from a group of storage devices with the smallest number of outstanding read requests among the plurality of storage devices, a storage device with the number of completed read requests that exceeds a predefined threshold as the target storage device, and selecting a storage device from the group of storage devices in a random manner as the target storage device if none the group of storage devices has the number of completed read requests that exceeds the predefined threshold. In an alternative embodiment, determining, from the plurality of storage devices, a storage device with the smallest number of outstanding read requests in as the target storage device may further comprise: determining, from a group of storage devices with the smallest number of outstanding read requests in the plurality of storage devices, a storage device with the largest number of completed read requests as the target storage device.

In an embodiment, alternatively or in addition, the number of outstanding read requests and the number of completed read requests recorded for each storage device may be updating by: resetting the number of completed read requests for a third storage device of the plurality of storage devices to zero and setting an index of the target storage device for processing the read requests as invalid, if the number of outstanding read requests for the third storage device is zero and no new read requests reach the third storage device; and determining, from the plurality of storage devices, a target storage device for processing the read requests according to the number of outstanding read requests and the number of completed read requests recorded for each storage device may comprise: selecting a storage device from the plurality of storage devices in a random manner as the target storage device if the index of the target storage device is set as invalid.

A second aspect of the present disclosure provides a method for controlling data reading from a storage system. The storage system includes a plurality of storage devices and a backup of the data is stored in each of the plurality of storage devices. The method comprises: initializing by setting an index of the optimal storage device as invalid and setting the number of outstanding read requests and the number of completed read requests for each of the plurality of storage devices as zero, and performing the following steps:

Step 1: decreasing the number of outstanding read requests of a storage device of the plurality of storage devices by one upon processing of a read request of the storage device being completed; and going to Step 2;

Step 2: determining whether the number of outstanding read requests of the storage device is 0, and going to Step 3 if the number of outstanding read requests is determined as 0; otherwise going to Step 5;

Step 3: determining whether the index of the optimal storage device is invalid or equal to an index of the storage device; and if the index of the optimal storage device is determined as invalid or equal to the index of the storage device, going to Step 5; otherwise going to Step 4;

Step 4: setting the index of the optimal storage device as invalid, and setting the number of completed read requests of the storage device as 0; and going to Step 8;

Step 5: increasing the number of completed read requests of the storage device by 1; and going to Step 6;

Step 6: determining whether the number of completed read requests of the storage device exceeds a predefined threshold; and if the number of completed read requests of the storage device exceeds a predefined threshold, going to Step 7, otherwise going to Step 8;

Step 7: setting the index of the optimal storage device as the index of the storage device, and resetting the number of completed read requests as zero for each of the plurality of storage devices; and going to Step 8;

Step 8: if the index of the optimal storage device is invalid, selecting a target storage device from the plurality of storage devices randomly for serving next read request; otherwise selecting, from the plurality of storage devices, a storage device with an index corresponding to the index of the optimal storage device as the target storage device for serving the next read request.

A third aspect of the present disclosure provides an apparatus for controlling data reading from a storage system. The storage system includes a plurality of storage devices and a backup of the data is stored in each of the plurality of storage devices, the apparatus comprises: a counting module configured to record, for each of the plurality of storage devices, the number of currently outstanding read requests and the number of completed read requests within a predefined time period; a read request receiving module configured to receive a read request for reading data from the storage system; a determining module configured to determine, from the plurality of storage devices, a target storage device for processing the read request according to the number of outstanding read requests and the number of completed read requests recorded for each storage device; and a read request distributing module configured to send the read request to the target storage device.

A fourth aspect of the present disclosure provides another apparatus for controlling data reading from a storage system, the storage system including a plurality of storage devices and a backup of the data is stored in each of the plurality of storage devices, the apparatus comprising: an initializing module configured to initialize by setting the index of an optimal storage device as invalid and by setting the number of outstanding read requests and the number of completed read requests for each of the plurality of storage devices as 0, and a first counting module configured to decrease the number of outstanding read requests of a storage device of the plurality of storage devices by 1 upon processing of read requests of the storage device being completed; and transmit the updated number of outstanding read requests to a first judging module; a first judging module configured to determine whether the number of outstanding read requests for the storage device is 0, and cause a second judging module to take action if the number of outstanding read request is determined as 0, otherwise cause the second counting module to take action: a second judging module configured to determine whether an index of the optimal storage device is invalid or equal to an index of the storage device; and cause the second counting module to take action if the index of the optimal storage device is determined as invalid or equal to the index of the storage device, otherwise cause a first setting module to take action; a first setting module configured to set the index of the optimal storage device as invalid and set the number of completed read requests for the storage device as 0; and cause a selecting module to take action; a second counting module configured to increase the number of completed read requests for the storage device by 1; and cause a third judging module to take action; a third judging module configured to determine whether the number of completed read requests for the storage device exceeds a predefined threshold; and cause a second setting module to take action if the number of completed read requests of the storage device exceeds the predefined threshold, otherwise cause the selecting module to take action; a second setting module configured to set the index of the optimal storage device as the index of the storage device and reset the number of completed read requests to zero for each of the plurality of the storage devices; and cause the selecting module to take action; and a selecting module configured to select a target storage device from the plurality of storage devices randomly for serving the next read request if the index of the optimal storage device is invalid; otherwise select, from the plurality of storage devices, a storage device with an index corresponding to the index of the optimal storage device as the target storage device for serving the next read request.

A fifth aspect of the present disclosure provides an apparatus comprising at least one processor and at least one memory including computer program code, wherein the at least one memory and the computer program code are configured, with the at least one processor, to cause the apparatus to implement any of the methods according to the first aspect or second aspect of the present disclosure.

The method or apparatus according to embodiments of the present disclosure can shorten I/O response time, enhance I/O performance, and/or achieve load balance of I/O reading among a plurality of storage devices (e.g. a plurality of disks) without cross-node communication and at the same time without reducing throughput of the storage system.

Though specific embodiments are illustrated in the drawings by way of example, it should be understood that description of particular embodiments is not intended to limit the embodiments to the exact form being disclosed.

BRIEF DESCRIPTION OF THE DRAWINGS

Objectives, advantages and other features of the present disclosure will become more apparent from the following disclosure and claims. For illustration purpose only, example embodiments are described hereby in a non-limiting manner with reference to accompanying drawings, in which:

DETAILED DESCRIPTION OF EMBODIMENTS

In the following description, many details are illustrated for the purpose of illustration. However, those skilled in the art would realize that the embodiments of the present disclosure may be implemented without these specific details. Therefore, the present disclosure is not intended to be limited by the embodiments shown here but will be endowed with the broadest scope consistent with the principles and features described herein.

It should be appreciated that terms "a first", "a second", etc. are only used to distinguish one element from another. As a matter of fact, a first element can also be called a second element and vice versa. It should also be appreciated that "comprise", "comprising", "include" and "including" are only used to indicate the presence of the illustrated features, elements, functions or components without excluding the presence of one or more other features, elements, functions or components.

For ease of explanation, some embodiments of the present disclosure will illustrate corresponding methods or apparatus using a RAID 1 structure as an example of. However, as can be understood by those skilled in the art, embodiments of the present disclosure are by no means limited to being applied in storage systems with the RAID1 structure, but could be applied in any storage system where similar problems exist.

Figure 1:
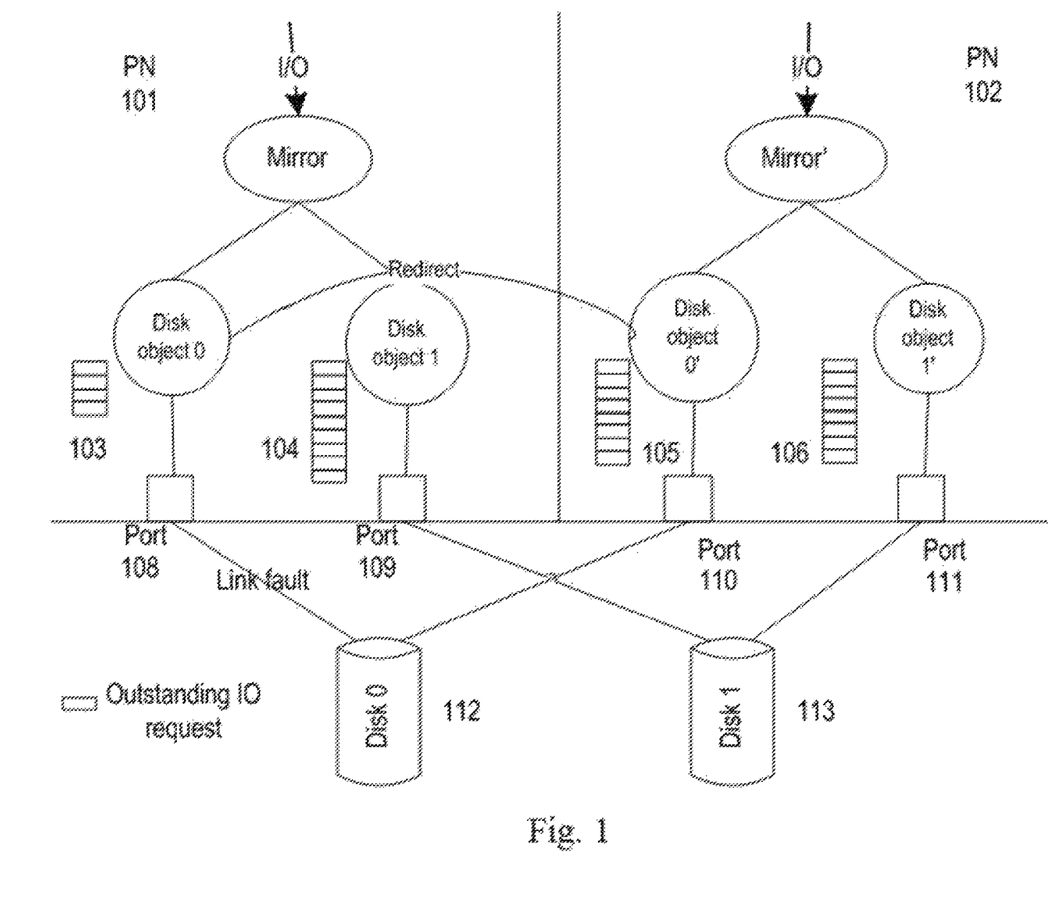
FIG. 1 shows a schematic structural diagram of an example storage system in which methods or apparatus according to embodiments of the present disclosure can be implemented.

FIG. 1 shows a schematic diagram of a storage system 100 with two processor nodes, in which methods and apparatus according to the embodiments of the present disclosure may be implemented. The storage system 100 in FIG. 1 has two processor nodes, namely, the processor node 1 shown in the left figure (denoted as PN101) and the processor node 2 shown in the right figure (denoted as PN102). However, as can be appreciated by those skilled in the art, methods and apparatus according to embodiments of the present disclosure may also be applied to a storage system with a more mirrors. For instance, embodiments of the present disclosure may be applied to a RAID 1 storage structure with any number of disks.

As shown in FIG. 1, RAID group and disk objects are mirrored in both sides of the memory. RAID group has two edges attached to downstream disk objects (112, 113). The mirrored disk objects at different processor nodes access a same disk through dual SCSI disk ports (108, 109; 110, 111), which provides constant reliability for RAID group and disks.

In the architecture of FIG. 1, a read request may be sent to any disk (112, 113). The reading performance of the mirror RAID group may be double of the disk performance in theory. However, response time of a disk varies rapidly, for example, in second level. Change of the disk performance is affected by lots of factors. Usually, the response time of a disk will be longer if the disk has more outstanding I/O to be processed (e.g. as shown in 103-106). For a spindle disk, sequential I/O can result in better performance than random I/O. Additionally, the disk package SCSI port bandwidth is shared with other disks connected to the same port. In the architecture shown in FIG. 1, if a disk link fails from one side, for example, failure occurs at the left side, all traffic of the failed disk will be redirected to its peer. In this case, the response time will increase significantly due to overhead for I/O forwarding, specifically for the solid-state disk driver (SSD).

To estimate disk response time more effectively to determine the disk for processing a read request more accurately, embodiments of the present disclosure propose obtaining the number of outstanding read I/O for each disk, and thereby estimating the disk response time. As write I/O should be sent to each disk in RAID 1, it may be assumed that influence of queue depth of write requests is same for all disks.

An example method 200 for controlling data reading from a storage system according to embodiments of the present disclosure is now described with reference to FIG. 2. The method may be implemented in the storage system shown in FIG. 1 but is not limited to being implemented in the example structure. The storage system includes a plurality of storage devices (e.g. a plurality of independent disks) and a backup of the data is stored in each of the plurality of storage devices.

Figure 2:
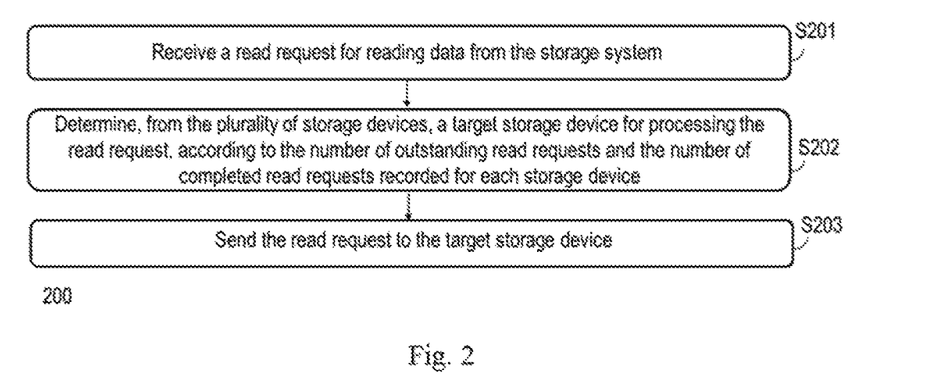
FIG. 2 shows a flow chart of a method for controlling data reading from the storage system according to embodiments of the present disclosure.

As shown in FIG. 2, the method includes: receiving a read request for reading data from the storage system at block S201; determining, from the plurality of storage devices, a target storage device for processing the read request, according to the number of outstanding read requests and the number of completed read requests recorded for each storage device at block S202; and sending the read request to the target storage device at block S203.

In an embodiment, the number of outstanding read requests and the number of completed read requests recorded for each storage device employed at block S202 may be updated in the following manner: if a storage device of the plurality of storage devices in the storage system, for example a first storage device, receives a new read request, the number of outstanding read requests for the first storage device is increased by one; and/or, if one of the plurality of storage devices, such as a second storage device, finishes processing a read request, the number of outstanding read requests for the second storage device is decreased by one and the number of completed read requests for the second storage device is increased by one. As can be appreciated by those skilled in the art, the updating operation of the number may be implemented in other manners. For example, the updating of the number may be performed with a step of 2, namely, updating is performed after processing every two read requests of I/O. Embodiments of the present disclosure are not limited hereto.

In an embodiment, a period for obtaining the number of completed read requests may be predefined as a period between receiving or distributing two consecutive read requests by the storage system. For instance, the number of completed read requests for each of the plurality of storage devices may be reset as zero after operation of block S203 is performed (i.e. after sending the read requests to the target storage device), such that the number of completed read requests represents the number of read requests completed within a period between distributing a read request and distributing a next read request. However, the predefined period may also be configured in other way.

In another embodiment, at block S202, determining the target storage device for processing the read request may include: determining, from the plurality of storage devices, a storage device with the smallest number of outstanding read requests as the target storage device. According to the embodiment, the storage device (e.g. disk) with the lightest read request load at present can be selected to process the new read requests, which is advantageous for load balancing of the read requests. Moreover, if a plurality of storage devices have same load initially, a disk having faster processing speed can process more read requests and have fewer outstanding read requests. In this case, a disk with faster processing speed will be finally selected to serve the next read request. Supposing disk 1 processes faster than disk 0, then the next I/O read request will be sent to disk 1 to obtain better performance.

Figure 3:
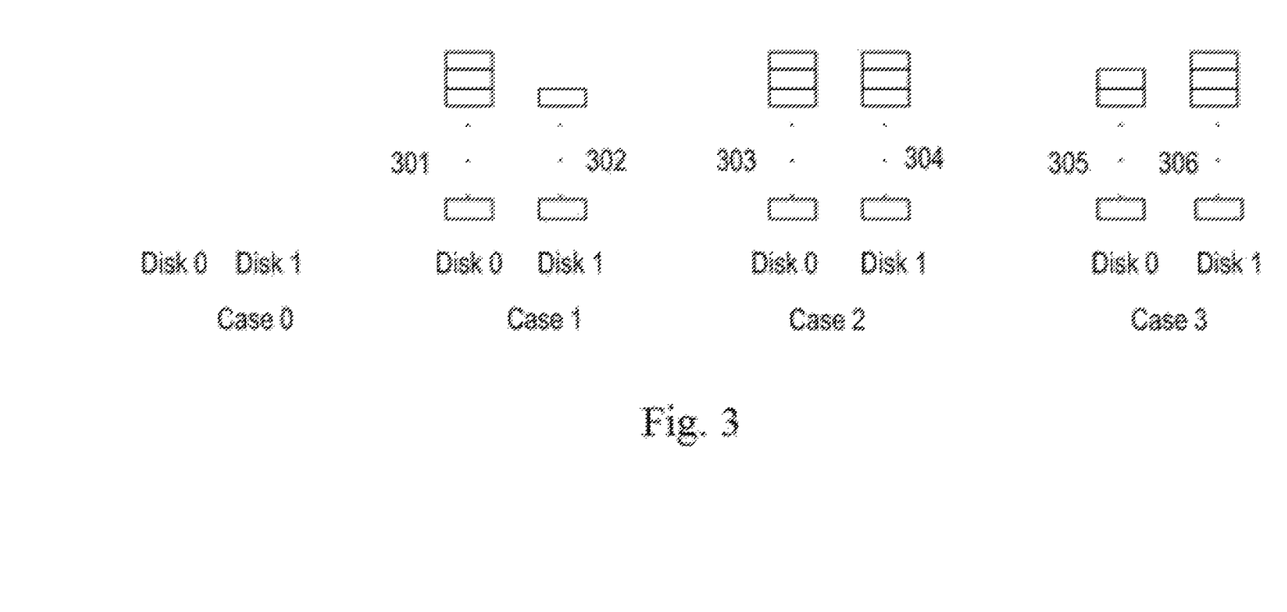
FIG. 3 shows a schematic diagram of different I/O processing state of two disks in the storage system.

FIG. 3 shows a schematic diagram of different I/O processing state two disks in the storage system, wherein each small block in queue 301-306 represents an outstanding I/O request. Case 0 may be an initial state wherein the number of outstanding read requests for disks 0 and 1 is both 0. At this time, information with respect to which disk processes faster is not available yet, and therefore, an incoming read request can be sent to either disk. For cases 1 and 3, the number of outstanding read requests for each disk is different. According to the embodiments of the present disclosure, the read request may be sent to the disk with fewer outstanding read requests.

In an embodiment, if a group (a plurality of) of storage devices in the plurality of storage devices has same number of outstanding read requests, as shown in case 2 of FIG. 3, wherein the disk 0 and disk 1 have the same number of outstanding read requests (namely, the number of outstanding IO requests is the same in queue 303 and 304), then at block S202, the target storage device may be determined further according to the number of completed read requests of the group of storage devices. For example, at block S202, from a group of storage devices with the smallest number of outstanding read requests in the plurality of storage devices, a storage device with the number of completed read requests exceeding a predefined threshold may be determined as the target storage device. In another embodiment, if none of the group of storage devices has a number of completed read requests exceeding the predefined threshold, then at block S202, a storage device may be selected randomly from the group of storage devices as the target storage device. In still another embodiment, if none of the group of storage devices with the smallest number of outstanding read requests has a number of completed read requests exceeding the predefined threshold, other parameters may be used to determine the target storage device, rather than selecting randomly.

In an embodiment, at block S202, a storage device with the largest number of completed read requests in the group of storage devices with the smallest number of outstanding read requests of the plurality of storage devices may be determined as the target storage device. In another embodiment, the target storage device may be determined firstly based on a predetermined threshold and a storage device with the largest number of completed read requests is selected as the target storage device if none of the group of storage devices has a number of completed read requests exceeding the predefined threshold.

According to the above embodiments, speed of a disk in a short time period may be predicted based on the number of completed read requests for the disk, and current load of the disk may be considered, so that a more suitable disk may be selected to serve the next read request. This is obviously more advantageous than the conventional method which randomly selects any disk.

In method 200, the possible case of non-consecutive read requests may be considered. For example, if the number of outstanding read requests in a storage device, for example a third storage device in the plurality of storage devices, is zero, namely, the third storage device has processed all the I/O read requests, and if no new read requests reach the third storage device, then the case of non-consecutive requests occurs. In this case, if no new I/O read requests reach the storage device (e.g. disk), the number of completed read requests of the storage device will not increase, and it may not be selected as the target storage device due to a small number of completed read requests. However, in this case, a smaller number of completed read requests cannot represent processing speed any more, as it is caused by non-consecutive I/O requests. Therefore, the selection of the target storage device based on the number of completed read requests is possibly not optimal. In light of this case, in an embodiment, if the number of outstanding read requests of the third storage device of the plurality of storage devices is zero and no new read requests reach the third storage device, the numbers may be updated by resetting the number of completed read requests for the third storage device as zero and setting an index of the target storage device for processing the read requests as invalid; and in this case, if the index of the target storage device is detected as invalid at block S202, a storage device may be selected randomly from the plurality of storage devices as the target storage device.

Flowchart of another method 400 for controlling data reading from a storage system is described with reference to FIG. 4. The method 400 also determines the disk for serving a read request by exploiting the number of outstanding read requests and the number of completed read requests for each disk.

Method 400 may also be implemented in the storage system shown in FIG. 1, but is not limited to being implemented in such structure. Instead, it can be applied to any storage system. The storage system comprises a plurality of storage devices and a backup of the data is stored in each of the plurality of storage devices.

Figure 4:
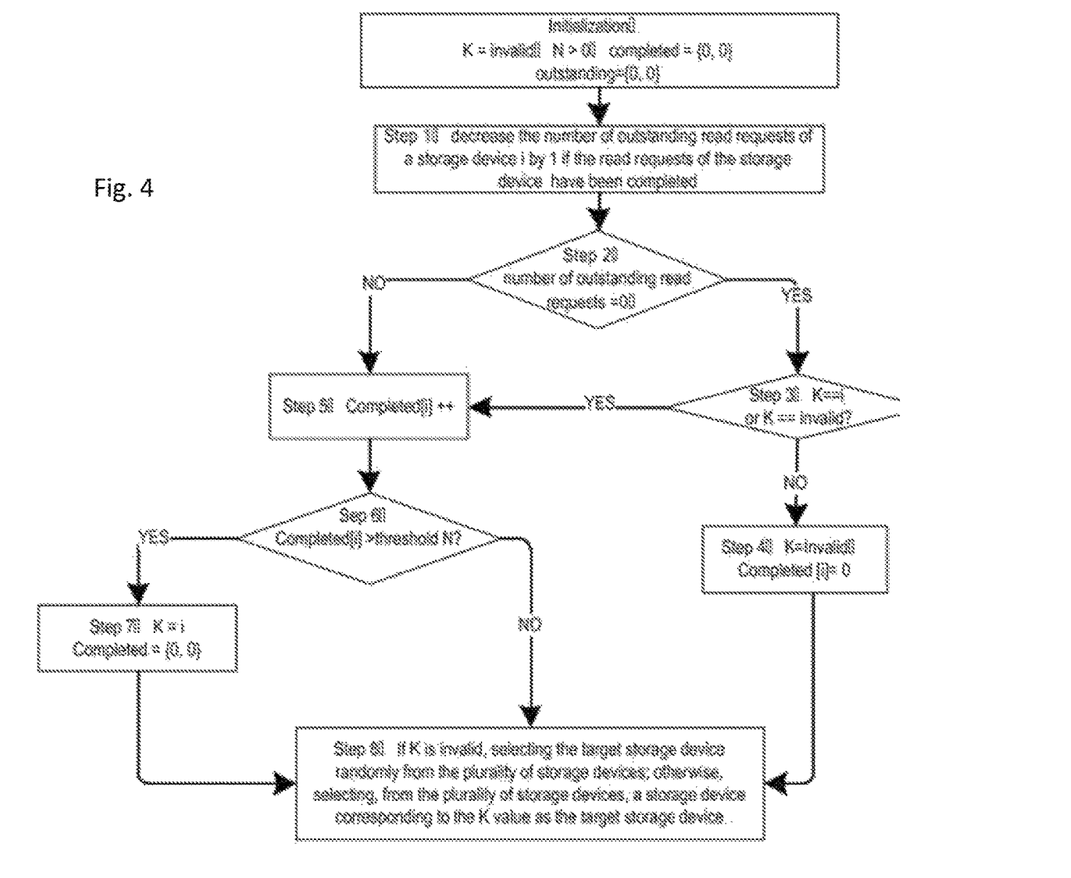
FIG. 4 shows a flow chart of another method for controlling data reading from the storage system according to embodiments of the present disclosure.

As shown in FIG. 4, method 400 comprises initializing operation, wherein the initialization may be performed by setting an index of an optimal storage device as invalid, and setting the number of outstanding read requests and the number of completed read requests for each of the plurality of storage devices as 0. Method 400 further comprises the following steps:

Step 1: decreasing the number of outstanding read requests for a storage device of the plurality of storage devices by 1 upon processing of a read request of the storage device being completed; and going to Step 2;

Step 2: determining whether the number of outstanding read requests of the storage device is 0, and going to step 3 if the number of outstanding read requests is determined as 0; otherwise going to Step 5;

Step 3: determining whether the index of the optimal storage device is invalid or equal to an index of the storage device; and if the index of the optimal storage device is determined as invalid or equal to the index of the storage device, going to Step 5; otherwise going to Step 4;

Step 4: setting the index of the optimal storage device as invalid, and setting the number of completed read requests of the storage device as 0; and going to Step 8;

Step 5: increasing the number of completed read requests of the storage device by 1; and going to Step 6;

Step 6: determining whether the number of completed read requests of the storage device exceeds a predefined threshold; and if the number of completed read requests for the storage device exceeds a predefined threshold, going to Step 7, otherwise going to Step 8;

Step 7: setting the index of the optimal storage device as the index of the storage device, and resetting the number of completed read requests for each of the plurality of storage devices as zero; and going to Step 8;

Step 8: if the index of the optimal storage device is invalid, selecting a target storage device from the plurality of storage devices randomly for serving next read request; otherwise selecting, from the plurality of storage devices, a storage device with an index corresponding to the index of the optimal storage device as the target storage device for serving the next read request In an embodiment, if a group of storage devices have same number of outstanding read requests, method 400 is employed to select a target storage device from the group of storage devices. For the case that the number of outstanding read requests is different, the target storage device may be determined based on the number of outstanding read requests.

In another embodiment, some steps of method 400 may be omitted or substituted with other operations. For instance, without considering the case of non-consecutive I/O requests, Steps 2, 3 and 4 may be omitted and Step 1 is directly followed by Step 5. In another embodiment, the judging operation in Step 6 may also be substituted with a comparing operation. For example, the number of completed I/O reading for each storage device may be compared and in Step 7, the index of the optimal storage device is configured as an index of the storage device with the largest number of completed I/O reading.

Figure 5:
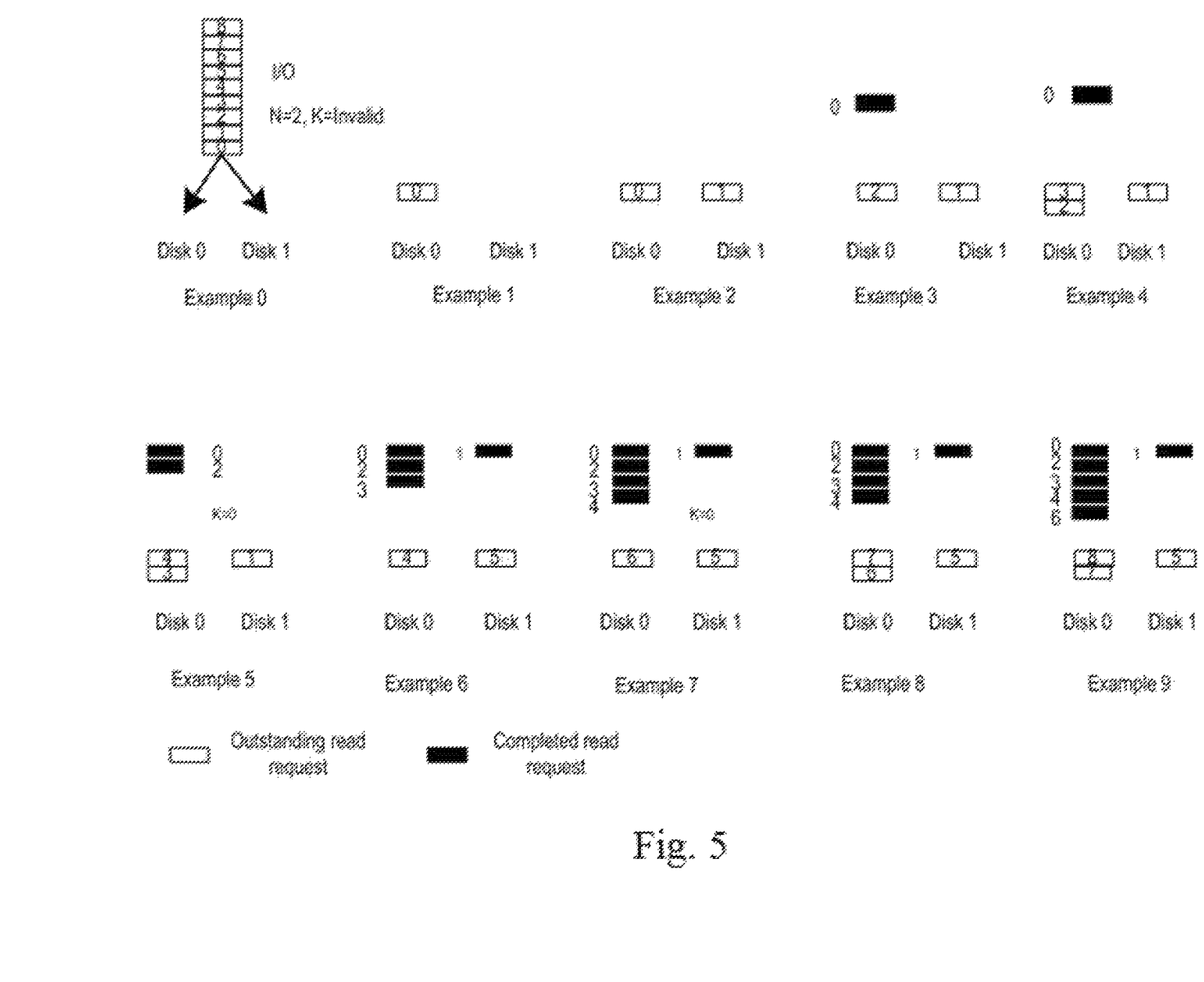
FIG. 5 illustrates an example for determining a target storage device according to an embodiment of the present disclosure.

In FIG. 5, examples 0-9 for selecting the target storage device with the method according to embodiments of the present disclosure are shown. In these examples, it is assumed that a SSD RAID1 storage system is employed. If disk 1 of the SSD falls into a single loop failure, then the response time would be almost doubled. If the response time of disk 0 is T, then the response time of disk 1 is 2T. Assume that the RAID group only has reading traffic at the current node and has no traffic at the peer node.

As shown in FIG. 5, in example 0, a user transmits nine I/O requests for the RAID group in order, with each interval between I/Os being T/2. At the initialization stage, threshold N of Step 6 is set as 2 and index K of the optimal storage device is set as invalid.

In example 1, none of disks 0 and 1 has outstanding I/Os. Thus, I/O 0 may be sent to any disks randomly. In example 1, the I/O 0 is sent to disk 0.

In example 2, disk 0 has one outstanding read request and disk 1 has no outstanding read request. Thus. I/O 1 is sent to disk 1 with the method according to the embodiments of the present disclosure.

In example 3, processing of I/O 0 in disk 0 has been completed and returned. The number of completed read request in disk 0 is 1, the number of outstanding read request is 0 and the number of outstanding read request in disk 1 is 1. I/O 2 is sent to disk 0 with the method according to the embodiments of the present disclosure.

In example 4, both disks have one outstanding I/O. The next I/O 3 may be sent to any disk as K is configured as invalid. In this example, I/O 3 is sent to disk 0.

In example 5, processing of I/O 2 in disk 0 has been completed and at the same time, the number of outstanding read request of the two disks is same, and the number of completed read request in disk 0 reaches a threshold N=2. Therefore, next I/O 4 is sent to disk 0, and K=0, with a method according to embodiments of the present disclosure.

In example 6, processing of both I/O 1 and I/O 3 has been completed, disk 1 has no outstanding I/O request and the next I/O 5 is sent to disk 1.

In example 7, processing of I/O 4 has been completed. The next I/O 6 is sent to disk 0 and K is updated to be 0, with a method according to embodiments of the present disclosure.

In example 8, when I/O 7 is incoming, the number of outstanding I/Os in both disks is 1 and the I/O 7 is sent to disk 0 corresponding to K.

In example 9, disk 0 has completed processing of I/O 6, and both disks have the same number of outstanding I/O and I/O 8 is also sent to disk 0 corresponding to K.

It can be known from the above embodiments, with method according to embodiments of the present disclosure, most I/Os are sent to disk 0 which is faster. It reduces the response time of the storage system and enhances performance.

A structure of apparatus 600 for controlling data reading from a storage system is described with reference to FIG. 6. The storage system to which apparatus 600 applies includes a plurality of storage devices and a backup of the data is stored in each of the plurality of storage devices. For example, the storage system may be (but not limited to) the storage system 100 as shown in FIG. 1. Apparatus 600 may perform method 200 described with reference to FIG. 2, but is not limited to performing the method 200. Likewise, the method 200 may be implemented by apparatus 600, but not limited to being performed by the apparatus 600. For instance, at least some operations of method 200 may be performed by other apparatuses.

Figure 6:
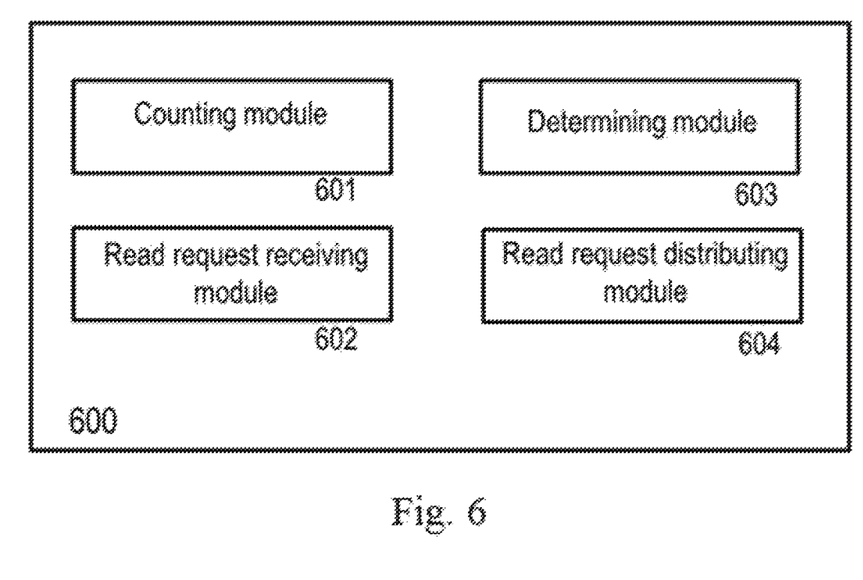
FIG. 6 shows an example structural diagram of an apparatus according to embodiments of the present disclosure.

As shown in FIG. 6, apparatus 600 includes a counting module 601 configured to record the number of currently outstanding read requests and the number of completed read requests within a predefined time period for each of the plurality of storage devices; a read request receiving module 602 configured to receive a read request for reading data from the storage system; a determining module 603 configured to determine a target storage device for processing the read request from the plurality of storage devices according to the number of outstanding read requests and the number of completed read requests recorded for each storage device; and a read request distributing module 604 configured to send the read request to the target storage device.

In an embodiment, modules 602-604 may be configured to perform steps S201-S203 of the method 200 shown in FIG. 2. Thus, descriptions described with reference to method 200 also apply here.

In an embodiment, counting module 601 may be further configured to: increase the number of outstanding read requests of a first storage device of the plurality of storage devices by 1 if the first storage device receives a new read request; and decrease the number of outstanding read requests for a second storage device of the plurality of storage devices by 1 and increase the number of completed read requests for the second storage device by 1, if the second storage device finishes processing a read request.

In another embodiment, counting module 601 may be further configured to reset the number of completed read requests for each of the plurality of storage devices to zero after he read request being sent to the target storage device.

In an embodiment, the determining module 603 may be further configured to determine, from the plurality of storage devices, a storage device with the smallest number of outstanding read requests as the target storage device. In another embodiment, the determining module may be further configured to: determine, from a group of storage devices with the smallest number of outstanding read requests in the plurality of storage devices, a storage device with the number of completed read requests exceeding a predefined threshold as the target storage device, and select a storage device from the group of storage devices randomly as the target storage device if none of the group of storage devices has a number of completed read requests f exceeding the predefined threshold.

Alternatively, in an embodiment, the determining module may be further configured to determine, from a group of storage devices with the smallest number of outstanding read requests in the plurality of storage devices, a storage device with the largest number of completed read requests as the target storage device.

If non-consecutive read requests is taken into consideration, in an embodiment, the counting module 601 may be further configured to: reset the number of completed read requests for a third storage device of the plurality of storage devices as zero and set an index of the target storage device for processing the read requests as invalid, if the number of outstanding read requests for the third storage device is zero but no new read requests reach the third storage device; and the determining module 603 may be further configured to: select a storage device from the plurality of storage devices randomly as the target storage device if the index of the target storage device is set as invalid. This enables to falling back to random selection to ensure load balance if an optimal target storage device cannot be obtained according to the number of completed read requests.

Figure 7:
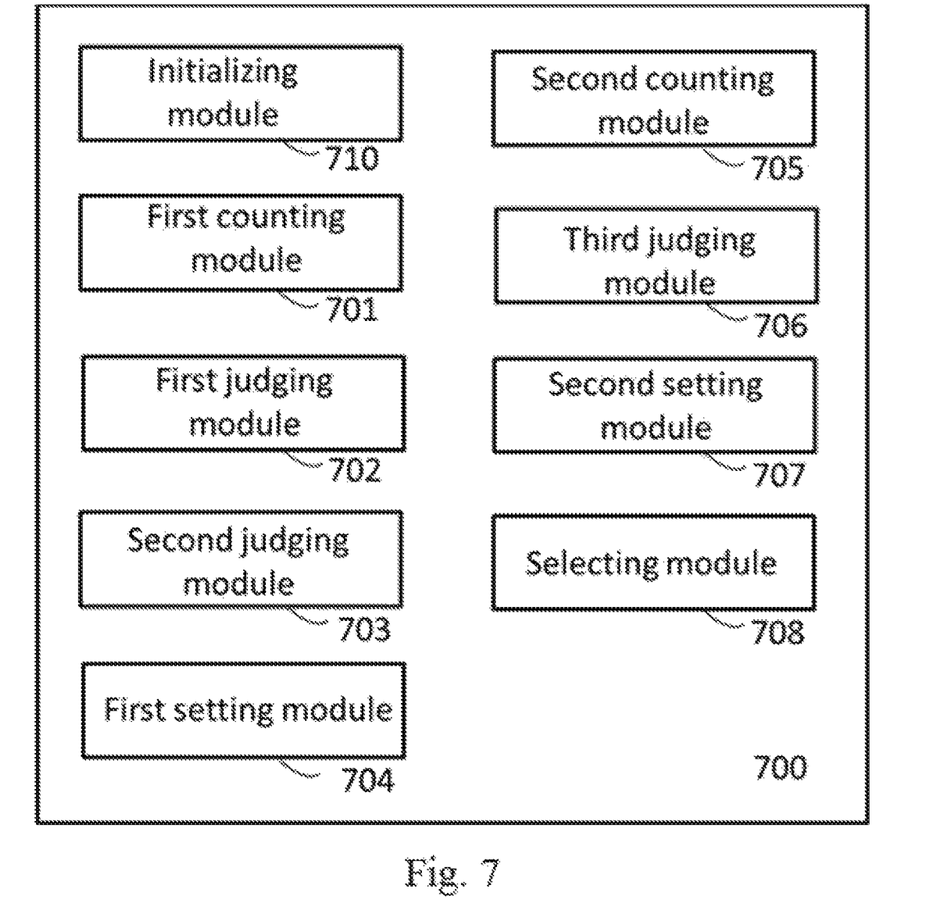
FIG. 7 shows an example structural diagram of another apparatus according to embodiments of the present disclosure.

FIG. 7 shows an example structure of another apparatus 700 for controlling data reading from the storage system. Apparatus 700 may also apply to the storage system comprising a plurality of storage devices, wherein backup of data are stored in each of the plurality of storage devices. The storage system may be storage system 100 as shown in FIG. 1, for instance, RAID 1. But the embodiments of the present disclosure are not limited to such storage structure.

Apparatus 700 may perform method 400 as shown in FIG. 4 but is not limited to performing the method 400. Similarly, method 400 is not limited to being performed by apparatus 700. At least some steps of method 400 may be implemented by other apparatuses.

As shown in FIG. 7, apparatus 700 comprises an initializing module 710 configured to initialize by setting an index of an optimal storage device as invalid and by setting the number of outstanding read requests and the number of completed read requests for each of the plurality of storage devices as 0, and the following modules:

A first counting module 701, configured to: decrease the number of outstanding read requests of a storage device of the plurality of storage devices by 1 if processing of a read requests have been completed by the storage device; and transmit the updated number of outstanding read requests to a first judging module 702;

A first judging module 702, configured to determine whether the number of outstanding read requests for the storage device is 0, and cause a second judging module 703 to take action if the number of outstanding read request is 0, otherwise cause a second counting module 705 to take action;

A second judging module 703, configured to determine if an index of the optimal storage device is invalid or equal to an index of the storage device; and cause the second counting module 705 to take action if the index of the optimal storage device is invalid or equal to the index of the storage device, otherwise cause a first setting module 704 to take action;

A first setting module 704, configured to set the index of the optimal storage device as invalid and set the number of completed read requests for the storage device as 0; and cause a selecting module 708 to take action;

A second counting module 705, configured to increase the number of completed read requests of the storage device by 1; and cause a third judging module 706 to take action;

A third judging module 706, configured to determine if the number of completed read requests for the storage device exceeds a predefined threshold; and cause a second setting module 707 to take action if the number of completed read requests of one storage device exceeds the predefined threshold, otherwise cause the selecting module 708 to take action;

A second setting module 707, configured to set the index of the optimal storage device as the index of the storage device and reset the number of completed read requests of each of the plurality of the storage devices to zero; and cause the selecting module 708 to take action;

A selecting module 708, configured to select a target storage device from the plurality of storage devices randomly for serving the next read request if the index of the optimal storage device is invalid; otherwise select, from the plurality of storage devices, a storage device with an index corresponding to the index of the optimal storage device as the target storage device for serving the next read request.

In an embodiment, modules 701-708 may be configured to perform Steps 1-8 of method 400 described with reference to FIG. 4. Therefore, descriptions of method 400 also apply here, and will not be repeated.

As can be appreciated by those skilled in the art, apparatuses 600-700 may also comprise other elements not shown in FIGS. 6-7. Moreover, in some embodiments, some elements in FIGS. 6-7 may be omitted.

Advantages of the methods and apparatus proposed in the embodiments of the present disclosure include at least one of the following:

reducing I/O response time and improving I/O performance, achieving load balance of read I/O among a plurality of storage devices (e.g. a plurality of disks) without cross-node communication and at the same time without reducing throughput of the storage system.

Those skilled in the art would readily realize that blocks or steps in the aforementioned various methods may be executed by a programmed computer. In the present disclosure, some embodiments also intend to cover the program storage device, for example, a digital data storage medium which is a machine or computer readable and coding-machine executable or computer executable instruction program, wherein the instruction executes some or all steps of the above mentioned method. A program storing device may be, for example, a digital memory such as a disk and a magnetic storage medium of a magnetic tape, a disk drive or an optical readable digital data storage medium. The present embodiment also intends to cover a computer programmed to execute steps of the method. Some embodiments intend to cover an apparatus comprising at least one processor, and at least one memory comprising computer program code, wherein the at least one memory and the computer program code are configured to, with at least one processor, cause the apparatus to implement method 200 or 400.

The functions of various elements of the apparatus as shown in figures may be provided by use of software, dedicated hardware and hardware associated with software and capable of executing software, or firmware, or combination thereof. When it is provided by a process, the function may be provided by a single dedicated processor, by a single shared processor or a plurality of separate processors. Moreover, the term "processor" may include but not be limited to digital signal processor (DSP) hardware, a network processor, an Application Specific Integrated Circuit (ASIC), a field programmable gate array (FPGA), a read-only memory (ROM) for storing software, a random access memory (RAM) and a non-volatile storage device. It may also comprise other regular and/or customized hardware.

It should be appreciated by those skilled in the art that the specification and figures are only used to explain principles of the present disclosure. Therefore, it should be understood that those skilled in the art may design various arrangements, though not explicitly described or shown herein, the arrangements embodies the principles of the present disclosure and are included in the spirit and scope of the present disclosure. Moreover, all the examples recited herein are mainly used for the teaching purpose to aid readers in understanding the principles of the present disclosure and the concepts contributed by the inventor and to further the present field, and it should be construed as not being restricted to the specifically recited examples and conditions. Besides, all the illustration and the specific embodiments of the principles, aspects and embodiments of the present disclosure also intend to cover the counterparts thereof.

We claim:

1. A method for controlling data reading from a storage system, the storage system including a plurality of storage devices and a backup of the data is stored in each of the plurality of storage devices, the method comprising:

receiving, at a computing device, a read request for reading data from the storage system;

determining, from the plurality of storage devices, a target storage device for processing the read request according to the number of outstanding read requests and the number of completed read requests recorded for each storage device, wherein determining, from the plurality of storage devices, the target storage device for processing the read request according to the number of outstanding read requests and the number of completed read requests recorded for each storage device comprises:

determining, from the plurality of storage devices, at least one storage device with the smallest number of outstanding read requests as the target storage device, and determining, from a group of storage devices with the smallest number of outstanding read requests among the plurality of storage devices, a storage device with the number of completed read requests that exceeds a predefined threshold as the target storage device; and sending the read request to the target storage device.

2. The method according to claim 1, wherein the number of outstanding read requests and the number of completed read requests recorded for each storage device are updated by:

increasing the number of outstanding read requests for a first storage device of the plurality of storage devices by one, if the first storage device receives a new read request; and decreasing the number of outstanding read requests for a second storage device of the plurality of storage devices by one and increasing the number of completed read requests for the second storage device by one, if the second storage device finishes processing a read request.

3. The method according to claim 1, further comprising:

resetting the number of completed read requests for each of the plurality of storage devices to zero after sending the read request to the target storage device.

4. The method according to claim 1, wherein determining, from the plurality of storage devices, a storage device with the smallest number of outstanding read requests as the target storage device further comprises:

in response to none of the group of storage devices having the number of completed read requests that exceeds the predefined threshold, selecting a storage device from the group of storage devices in a random manner as the target storage device.

5. The method according to claim 1, wherein determining, from the plurality of storage devices, a storage device with the smallest number of outstanding read requests as the target storage device further comprises:

determining, from a group of storage devices with the smallest number of outstanding read requests among the plurality of storage devices, a storage device with the largest number of completed read requests as the target storage device.

6. The method according to claim 1, wherein the number of outstanding read requests and the number of completed read requests recorded for each storage device are updated by:

resetting the number of completed read requests for a third storage device of the plurality of storage devices to zero and setting an index of the target storage device for processing the read requests as invalid, if the number of outstanding read requests for the third storage device is zero and no new read request reaches the third storage device; and wherein determining, from the plurality of storage devices, a target storage device for processing the read requests according to the number of outstanding read requests and the number of completed read requests recorded for each storage device comprises:

in response to the index of the target storage device being set as invalid, selecting a storage device from the plurality of storage devices in a random manner as the target storage device.

7. An apparatus for controlling data reading from a storage system, the storage system including a plurality of storage devices and a backup of the data is stored in each of the plurality of storage devices, the apparatus comprising at least one hardware processor configured to implement:

a counting module configured to record, for each of the plurality of storage devices, the number of currently outstanding read requests and the number of completed read requests within a predefined time period;

a read request receiving module configured to receive a read request for reading data from the storage system;

a determining module configured to determine, from the plurality of storage devices, a target storage device for processing the read request according to the number of outstanding read requests and the number of completed read requests recorded for each storage device, wherein the determining module is further configured to:

determine, from the plurality of storage devices, a storage device with the smallest number of outstanding read requests as the target storage device, and determine, from a group of storage devices with the smallest number of outstanding read requests among the plurality of storage devices, a storage device with the number of completed read requests that exceeds a predefined threshold as the target storage device; and a read request distributing module configured to send the read request to the target storage device.

8. The apparatus according to claim 7, wherein the counting module is further configured to:

increase the number of outstanding read requests for a first storage device of the plurality of storage devices by one, if the first storage device receives a new read request; and decrease the number of outstanding read requests for a second storage device of the plurality of storage devices by one and increase the number of completed read requests for the second storage device by one, if the second storage device finishes processing a read request.

9. The apparatus according to claim 7, wherein the counting module is further configured to:

reset the number of completed read requests for each of the plurality of storage devices to zero after the read request is sent to the target storage device.

10. The apparatus according to claim 7, wherein the determining module is further configured to:

in response to none of the group of storage devices having the number of completed read requests that exceeds the predefined threshold, select a storage device from the group of storage devices in a random manner as the target storage device.

11. The apparatus according to claim 7, wherein the determining module is further configured to:

determine, from a group of storage devices with the smallest number of outstanding read requests among the plurality of storage devices, a storage device with the largest number of completed read requests as the target storage device.

12. The apparatus according to claim 7, wherein the counting module is further configured to reset the number of completed read requests for a third storage device of the plurality of storage devices to zero and set an index of the target storage device for processing the read requests as invalid, if the number of outstanding read requests for the third storage device is zero and no new read request reaches the third storage device; and wherein the determining module is further configured to, in response to the index of the target storage device being set as invalid, select a storage device from the plurality of storage devices in a random manner as the target storage device.

13. A computer program product for controlling data reading from a storage system, the storage system including a plurality of storage devices and a backup of the data is stored in each of the plurality of storage devices, the computer program product comprising:

a non-transitory computer readable medium encoded with computer-executable code, the code configured to enable the execution of:

receiving a read request for reading data from the storage system;

determining, from the plurality of storage devices, a target storage device for processing the read request according to the number of outstanding read requests and the number of completed read requests recorded for each storage device, wherein determining, from the plurality of storage devices, the target storage device for processing the read request according to the number of outstanding read requests and the number of completed read requests recorded for each storage device comprises:

determining, from the plurality of storage devices, a storage device with the smallest number of outstanding read requests as the target storage device, and determining, from a group of storage devices with the smallest number of outstanding read requests among the plurality of storage devices, a storage device with the number of completed read requests that exceeds a predefined threshold as the target storage device; and sending the read request to the target storage device.

14. The computer program product according to claim 13, wherein the number of outstanding read requests and the number of completed read requests recorded for each storage device are updated by:

increasing the number of outstanding read requests for a first storage device of the plurality of storage devices by one, if the first storage device receives a new read request; and decreasing the number of outstanding read requests for a second storage device of the plurality of storage devices by one and increasing the number of completed read requests for the second storage device by one, if the second storage device finishes processing a read request.

15. The computer program product according to claim 13, wherein the code is further configured to enable the execution of:

resetting the number of completed read requests for each of the plurality of storage devices to zero after sending the read request to the target storage device.

16. The computer program product according to claim 13, wherein determining, from the plurality of storage devices, a storage device with the smallest number of outstanding read requests as the target storage device further comprises:
    in response to none of the group of storage devices having the number of completed read requests that exceeds the predefined threshold, selecting a storage device from the group of storage devices in a random manner as the target storage device.

17. The computer program product according to claim 13, wherein determining, from the plurality of storage devices, a storage device with the smallest number of outstanding read requests as the target storage device further comprises:
    determining, from a group of storage devices with the smallest number of outstanding read requests among the plurality of storage devices, a storage device with the largest number of completed read requests as the target storage device.

\* \* \* \* \*